United States Patent
Lovell et al.

(10) Patent No.: US 7,890,273 B2
(45) Date of Patent: Feb. 15, 2011

(54) DETERMINING FLUID AND/OR RESERVOIR INFORMATION USING AN INSTRUMENTED COMPLETION

(75) Inventors: John R. Lovell, Houston, TX (US);
Dinesh R. Patel, Sugar Land, TX (US);
Donald W. Ross, Houston, TX (US);
Stephen Harrison, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 243 days.

(21) Appl. No.: 11/768,022

(22) Filed: Jun. 25, 2007

(65) Prior Publication Data

US 2008/0201080 A1    Aug. 21, 2008

Related U.S. Application Data

(60) Provisional application No. 60/890,630, filed on Feb. 20, 2007.

(51) Int. Cl.
*G01F 1/00*    (2006.01)
(52) U.S. Cl. ...................................................... 702/45
(58) Field of Classification Search ............... 702/9, 702/12, 45, 47, 49; 73/152.18, 152.33, 204.11, 73/204.16, 204.17, 204.13
See application file for complete search history.

(56) References Cited

U.S. PATENT DOCUMENTS

| | | | |
|---|---|---|---|
| 6,758,271 B1 | 7/2004 | Smith | |
| 6,828,547 B2 | 12/2004 | Tubel | |
| 6,920,395 B2 | 7/2005 | Brown | |
| 7,000,696 B2 | 2/2006 | Harkins | |
| 7,412,881 B2 * | 8/2008 | Crawley et al. | 73/204.11 |
| 2005/0149264 A1 | 7/2005 | Tarvin | |
| 2005/0279510 A1 | 12/2005 | Patel | |

FOREIGN PATENT DOCUMENTS

| | | |
|---|---|---|
| GB | 2416871 A | 2/2006 |
| WO | 2004076815 A1 | 9/2004 |

\* cited by examiner

*Primary Examiner*—Drew A Dunn
*Assistant Examiner*—Stephen J Cherry
(74) *Attorney, Agent, or Firm*—Brandon S. Clark; Rodney Warfford

(57) ABSTRACT

To determine fluid flow information associated with a well, data from plural discrete temperature sensors in zones without radial fluid flow in the well are received. The fluid flow information associated with the well is derived by combining the received data from the plural discrete temperature sensors with reservoir data that is independent of the fluid flow. That information can be further enhanced by monitoring the changes of temperature data over time.

22 Claims, 6 Drawing Sheets

DETERMINING FLUID AND/OR RESERVOIR INFORMATION USING AN INSTRUMENTED COMPLETION

CROSS-REFERENCE TO RELATED APPLICATION

This claims the benefit under 35 U.S.C. §119(e) of U.S. Provisional Application Ser. No. 60/890,630, entitled "Method and Apparatus to Derive Flow Properties Within a Wellbore," filed Feb. 20, 2007, which is hereby incorporated by reference.

TECHNICAL FIELD

The invention relates generally to determining flow and/or reservoir information using a wellbore completion which creates zones without incoming radial flow, in which discrete temperature sensors are placed in those zones without radial fluid flow.

BACKGROUND

Flow information, such as mass flow rate of fluids in a wellbore, is useful for efficient management of hydrocarbon-producing wells or other types of wells. Flow rate data can be used to adjust or improve flow rates from particular zones within the well, to diagnose potential problems, or to trigger alarms. In combination with structural reservoir information, zonal flow rate data can be used to identify those reservoir bodies subject to depletion and which bodies could subsequently benefit from injection of fluid from a separate wellbore so as to maintain reservoir pressure. In combination with geological measurements such as relative permeability, flow information can be used to determine which flowing zones are producing hydrocarbon.

Conventionally, flow rate sensors, such as spinner devices run on a cable, are used to measure flow rates in a wellbore. Using such a mechanism to measure flow rates in a wellbore typically involves shutting in the well for an extended time period during which equipment for performing the measurement is set up, the spinner devices are run on a cable into the well, and the flow measurement data is taken.

Another technique for measuring flow rates is to use a venturi technique, in which a pressure drop across a particular orifice is measured to enable flow rates to be determined. Orifice-based devices tend to restrict an inner diameter of the tubing or completion in which hydrocarbon or other fluid flows.

Yet another technique of determining flow rates is to deploy an optical fiber into the well, where the optical fiber can be used to acquire temperature data and variations in that temperature allow inferences of flow. However, in certain scenarios, deploying optical fibers may not be desirable or practical and, more generally, it is difficult to place the optical fibers over only certain sections of a completion.

SUMMARY

In general, according to an embodiment, a method is provided for determining fluid flow and/or related reservoir properties associated with a well whose completion has zones which inhibit incoming radial fluid flow and where plural discrete temperature sensors are placed in those zones without radial flow. The fluid flow information along the wellbore and/or related reservoir properties are derived according to the received data from the discrete temperature sensors.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right, right to left, or diagonal relationship as appropriate.

In accordance with some embodiments, temperature measurements from discrete temperature sensors (such as permanent temperature sensors embedded in a sand face completion) are used to infer flow properties (e.g., flow rates) associated with fluid flow in a wellbore. The term "fluid flow" need not refer to the flow of a single fluid, but can also refer to the flow of multiple fluids within the wellbore, whether well-mixed or flowing in individual strata.

Generally, fluid temperature change along the wellbore can be affected by fluid flow. In accordance with some embodiments, the wellbore completion has zones which do not allow incoming (i.e. radial) fluid flow, and discrete temperature sensors are placed in those zones. The temperature sensors are in thermal contact with pipe sections of a completion string, in which fluid flows. The completion tubing is formed of a thermally conductive material, such as steel or other metal, such that the pipe cross-section effectively averages temperature of fluid flowing through the pipe cross-section. The temperature measurement made by the corresponding temperature sensor that is thermally contacted to the pipe section thus constitutes an average temperature measurement of fluid flowing through the pipe cross-section.

The collected measurement data is communicated to a surface computer (or a downhole computer) that is able to derive fluid flow information according to the measurement data collected by the discrete temperature sensors located in zones without radial fluid flow. A "computer" refers to any electronic device capable of performing one or more of the tasks described herein. In some implementations, additional sensors, such as heat-flux sensors, pressure sensors, optical temperature sensors, and so forth can further be provided to measure other data that is communicated to a computer for further improving the understanding of the fluid flow within the wellbore. Some of these sensors can be provided in zones where radial fluid flow is present. Additional reservoir information may be available to the computer, such as the geothermal temperature gradient across the reservoir, or the relative permeabilities of one fluid to another within each zone.

Some embodiments of the invention emphasize the use of the mechanical properties of the completion to optimize the functionality of the sensing mechanism. For example, because the completion has a relatively high thermal conductivity compared to the surrounding formation, attaching tightly coupled temperature sensors to the completion ensures the axial variation of temperature along the wellbore will be of a low enough spatial frequency along the wellbore that it can be well sampled by a discrete array of sensors along that same wellbore. The Nyquist theorem shows that exact reconstruction of a continuous-time baseband signal from its samples is possible if the sampling frequency is greater than twice the signal bandwidth. For a sufficiently thermally conductive completion, it is thus feasible to limit the location of temperature sensors to the areas where joints of the completion are attached together, since such joints are naturally zones with no radial flow.

An alternative way to achieve such low spatial frequency in measured temperature is to deploy the array of sensors inside the completion, e.g., on a stinger. This can be beneficial in applications that use completion joints which can themselves expand radially (such as expandable sand screens).

Figure 1:
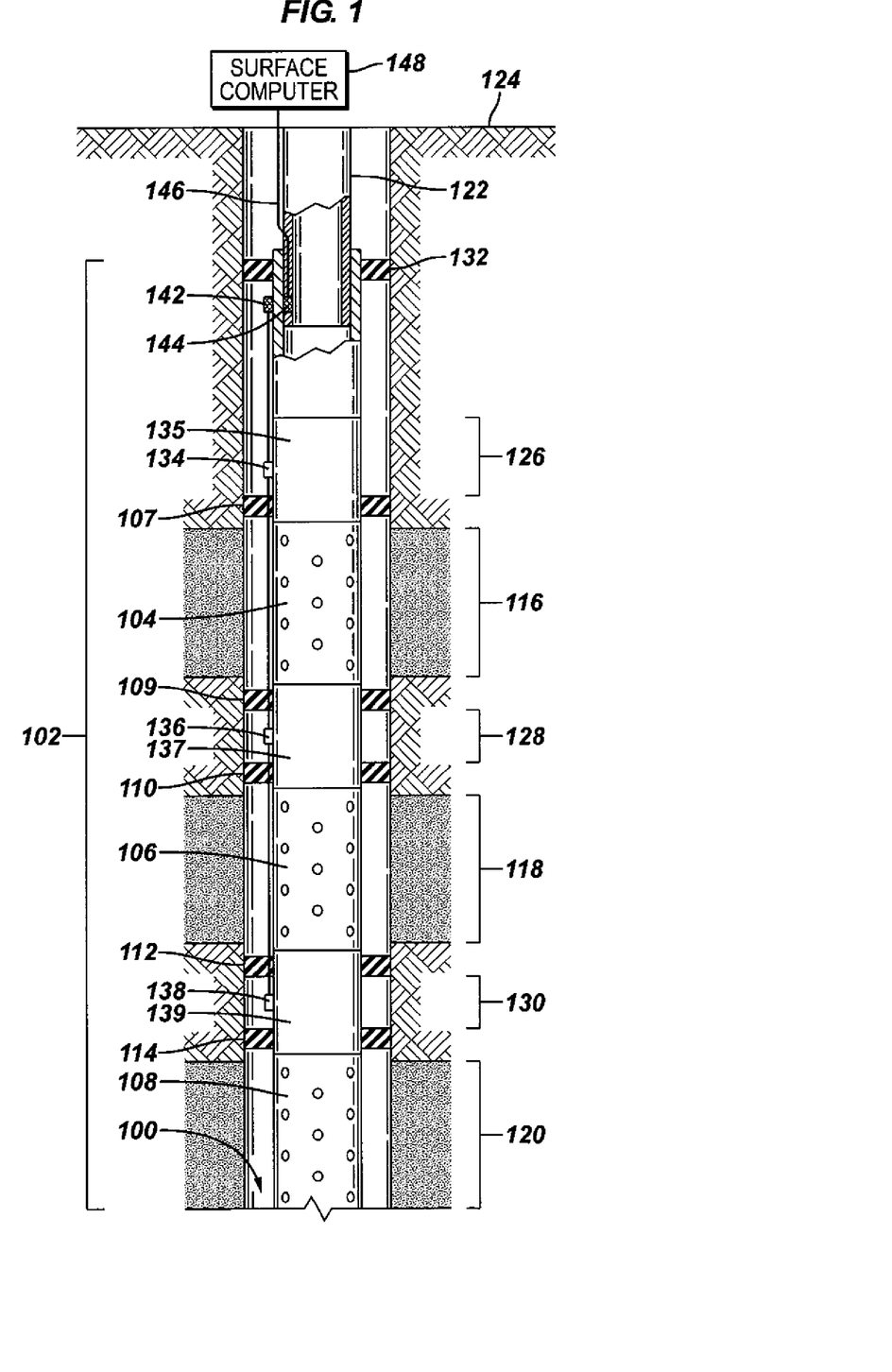
FIG. 1 illustrates a completion system in which fluid flow information can be derived using measurement data from discrete temperature sensors, in accordance with an embodiment.

FIG. 1 illustrates an example completion system that has a lower completion section 102 disposed in a wellbore 100. In some embodiments, the wellbore 100 can be lined with casing (or liner), or alternatively, the wellbore 100 (or at least a portion of the wellbore 100) is un-lined. The lower completion section 102 includes sand control sections 104, 106, and 108, each of which includes an outer shroud that surrounds a sand screen (or other filter structure) to filter particulates, such as sand. The sand control sections 104, 106, 108 are designed to filter particulates, such as sand, to prevent such particulates from flowing from a surrounding reservoir into the wellbore 100. Note that the sand control sections 104, 106, 108 can be part of a sand screen assembly.

Packers 107, 109, 110, 112, and 114 are provided to define several flow zones 116, 118, and 120 of the wellbore 100, which are isolated from each other by the packers. In each flow zone, fluids from the surrounding reservoir flow into the wellbore 100, and through the corresponding sand control section (104, 106, and 108) into an inner bore of the lower completion section 102. The fluids that flow into the lower completion section 102 flows upwardly to a tubing string 122 of an upper completion section. The tubing string 122 extends to the earth surface 124 such that reservoir fluids (e.g., hydrocarbons, fresh water, etc.) can be produced to the earth surface. In general the fluid will include a mix of oil, gas and water (or brine). In an alternative implementation, instead of producing fluids from the reservoir, fluids can be injected from the earth surface into the surrounding reservoir.

The flow zones 116, 118, and 120 are thus associated with radial flow of fluids (in which fluids flow in a radial direction of the wellbore between the reservoir and the inner bore of the lower completion section 102). The lower completion section 102 further includes zones without radial flow, including zones 126, 128, and 130. Such zones without radial flows are defined by respective packers. For example, the zone 130 is defined between packers 112 and 114, the zone 128 is defined between packers 108 and 110, and the zone 126 is defined above the packer 106 and below a main packer 132 of the lower completion section 102. A zone without radial flow (or "non-radial flow zone") is a zone through which there is no direct radial flow between the surrounding reservoir and the wellbore.

In a different implementation, instead of providing two packers to define each of the non-radial flow zones 126, 128, 130, a single packer can be used instead, in which case at least some of the non-radial zones 126, 128, 130 may be exposed to some amount of fluid flow in the exterior of the tubing, but that flow will not be radial—it will be generally parallel to the tubing.

In accordance with some embodiments of the invention, discrete temperature sensors 134, 136, and 138 are provided in respective non-radial flow zones 126, 128, 130 associated with blank pipe sections (135, 137, 139) of the sand control assembly. The sensors 134, 136, and 138 are part of an array of sensors. The discrete sensors 134, 136, and 138 are interconnected by a cable 140 to a first inductive coupler portion 142. Note that the sensors 134, 136, 138 can be integrated with the cable 140. A mating second inductive coupler portion 144 is provided on a lower portion of the tubing string 122 to allow the inductive coupler portions 142 and 144 (which collectively form an inductive coupler) to communicate data and power when the tubing string 122 is positioned such that the inductive coupler portion 144 is adjacent the inductive coupler portion 142. The cable 140 and the discrete sensors 134, 136, 138 can be part of an integrated sensor cable structure (also referred to as a sensor bridle).

The second inductive coupler portion 144 is connected by an electrical cable 146 to a surface computer 148 that is provided at the earth surface 124. Alternatively, instead of using the electrical cable 146, an optical or opto-electrical cable can be provided for communication. In other alternative implementations, wireless signaling can be used to communicate between downhole equipment and the surface computer 148. In yet further alternative implementations, wireless signaling can be used to communicate across different sections of downhole equipment. In the case that data is communicated via wireless or optical techniques, then a mechanism to power the downhole sensors is also provided (such as a battery or downhole power device).

Measurement data collected by the sensors 134, 136, and 138 is communicated over the cable 140, through the inductive coupler, and over the cable 146 to the surface computer 148 (or to a downhole computer, not shown). In some implementations, a downhole controller can be provided to receive the measurement data, with the downhole controller used to communicate the measurement data to the surface computer 148.

Based on at least the temperature measurement data collected by the sensors 134, 136, and 138 provided in non-radial flow zones 126, 128, and 130, the surface computer 148 (or a downhole computer) is able to derive fluid flow information regarding the flow of fluids in the completion string.

As discussed further below, in some implementations, additional sensors can be provided to acquire measurement data communicated to the surface computer 148 to enable the surface computer 148 to derive the fluid flow information.

Note that instead of using the inductive coupler to communicate data between the temperature sensors and the surface computer 148, a different technique of collecting the measurement data from the sensors 134, 136, and 138 is to lower an intervention device through the completion system, where the intervention device can be lowered on a slickline, wireline, coiled tubing, or drill pipe. In the case of slickline, wireline, or coiled tubing, the data can be transmitted to the surface using either electrical or optical cables embedded in the slickline, wireline, or coiled tubing. In the case of a drill pipe, the data can be transmitted using one of the following: an electrical wire pumped down the pipe, wireless telemetry, or conductors embedded within the drill pipe.

The temperature sensors 134, 136, and 138 are thermally contacted to respective blank pipe sections 135, 137, and 139 of the lower completion section 102 such that the temperature measured by each temperature sensor is the temperature of the corresponding pipe section. Note that the pipe section, being formed of a thermally conductive material, has a temperature that is close to the average of the temperatures of the fluids flowing through the pipe section.

Figure 2:
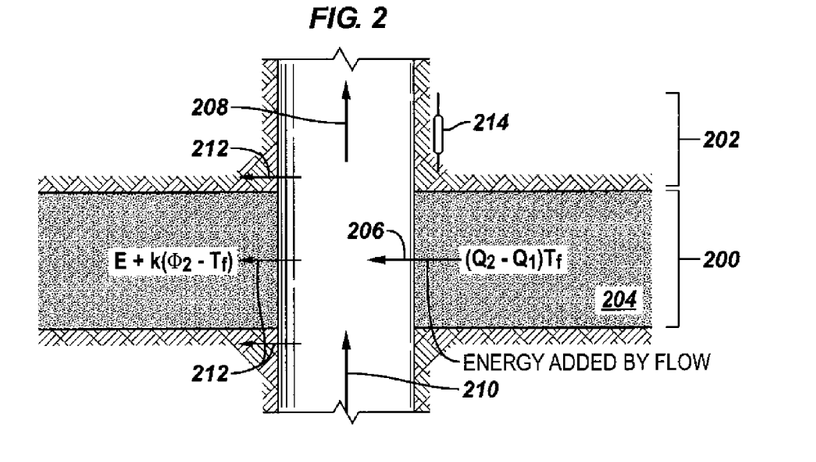
FIGS. 2-4 illustrate fluid flows in various parts of a well.

FIG. 2 illustrates a section of the completion system depicted in FIG. 1. The depicted section includes one radial flow zone 200 (corresponding to one of 116, 118, and 120 in FIG. 1) and one non-radial flow zone 202 (corresponding to one of 126, 128, and 130 in FIG. 1). In the radial flow zone 200, fluid flows from reservoir 204 into the wellbore 100 (as indicated by arrow 206). When dealing with multiphase flow, enthalpy formulations are used to complete an energy balance equation. By way of illustration of embodiments described herein, however, the case when the wellbore fluid is a single phase is considered, in which case the energy of the fluid is proportional to the flow rate and the temperature. Energy is added to the wellbore by the flow of fluids from the reservoir 204 into the wellbore 100, where this added energy is represented as $(Q_2-Q_1)T_f$, where $Q_2$ represents the outgoing axial flow (208) leaving the flow zone 200 into an area of the wellbore 100 above the flow zone 200, and $Q_1$ represents the incoming axial flow entering (210) the flow zone 200 from below in the wellbore 100. The parameter $T_f$ represents the temperature of the fluid that flows from the reservoir 204 into the wellbore 100.

Note that there is some fluid loss that exits in the flow zone 200 from the side of the wellbore 100, represented as 212 in FIG. 2. The fluid loss that exits from the side (212) of the wellbore 100 is associated with the following energy: $E+K(\theta_1-T_r)$, where E represents the energy lost to friction, turbulence, expansion, etc, and $K(\theta_1-T_r)$ represents the steady-state heat loss over the entire length of the flow zone 200 out of the wellbore into the surrounding reservoir. The parameter $\theta_1$ represents the temperature of the fluid entering (210) the flow zone 200, and $T_r$ represents the temperature of the reservoir 204. Note that the temperature of the fluid flowing into the wellbore may be different from the temperature of the rock some distance away from the reservoir because of Joule-Thompson effects—the incoming fluid will change temperature as a result of the radial pressure drop in the vicinity of the wellbore.

The reservoir temperature over a particular zone may be computed from a known geothermal gradient for that reservoir, or it may be estimated by taking a measurement of the stable temperature after all flow has ceased (e.g., when the wellbore is shut-in).

The parameter $K(\theta_1-T_r)$ can also be written as $k(\theta_1-T_r)dZ$, where $dZ$ represents a section of length along a completion, and $k(\theta_1-T_r)$ represents the steady-state heat loss per unit length. The heat loss along the completion is a function of the completion itself and the material surrounding that completion (e.g., whether it is cemented in place, or surrounded by gravel-pack). Over those zones with radial flow, the dominant energy transfer to/from the wellbore will be energy carried by the moving fluid. Over those zones with no radial flow, the dominant energy transfer (by definition) will be governed by the temperature difference between the completion and reservoir temperatures.

The energy exiting the flow zone 200 due to axial flow 208 in the wellbore 100 is represented as $Q_2\theta_2$, where $\theta_2$ is the temperature of the fluid at the top of the flow zone 200 (when it exits the flow zone 200). Note that a temperature sensor 214 provided in the non-radial flow zone 202 allows for the temperature $\theta_2$ to be measured. Also note that the temperature $\theta_1$ of the axial flow 210 entering the flow zone 200 is measured by a corresponding sensor 214 in the non-radial flow zone below the flow zone 200 depicted in FIG. 2. The energy of fluid entering the flow zone 200 from below in the wellbore 100 is represented as $Q_1\theta_1$.

In the case where there is no change in phase (the flow of fluid is all liquid or all gas), balancing energy across the flow zone 200 provides:

$$Q_2\theta_2 = Q_1\theta_1 + (Q_2-Q_1)T_f - K(\theta_1-T_r)d - E. \quad\quad \text{(Eq. 1)}$$

Note that $Q_1$ and $Q_2$ are unknowns in Eq. 1 and that K and E depend upon the completion properties.

Figure 3:
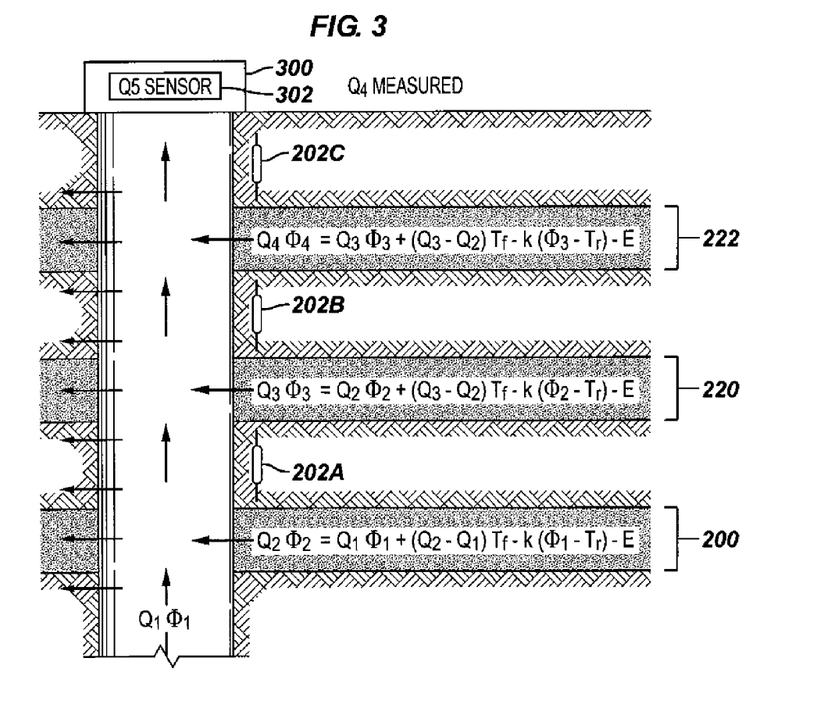

In a well with multiple flow zones, as depicted in FIG. 3, there are additional flow parameters, including $Q_1$, $Q_2$, $Q_3$, $Q_4$, and so forth. Thus, as depicted in FIG. 3, a system of equations for multiple flow zones 200, 220, and 222 is depicted. Corresponding sensors 202A, 202B, and 202C are provided to allow for measurement of the temperatures in non-radial flow zones, which temperatures are represented as $\theta_1$, $\theta_2$, $\theta_3$, and $\theta_4$ in FIG. 3. If more flow zones are present, then further equations are provided.

Assuming that flow zone 222 is at the uppermost zone associated with the reservoir, then the flow rate $Q_4$ (flow exiting the uppermost zone 222 into the wellbore 100) is derived from a measured flow rate $Q_5$, which can be the flow rate at the wellhead 300 (located at the earth surface). The flow rate $Q_5$ can be measured with a flow rate sensor 302 at the wellhead 300. From $Q_5$ the flow rate $Q_4$ can be calculated. $Q_4$ and $Q_5$ can differ due to various factors, such as fluid expansion, phase change, and so forth. However, standard techniques exist to compute $Q_4$ (the flow rate at the bottom of the tubing string (e.g., 122 of the upper completion section) from $Q_5$.

Since $Q_4$ is known, the system of three equations in FIG. 3 can be used to solve for the three unknown flow rates $Q_1$, $Q_2$, and $Q_3$. This algorithm can be extended to an arbitrary number of flowing zones.

Figure 4:
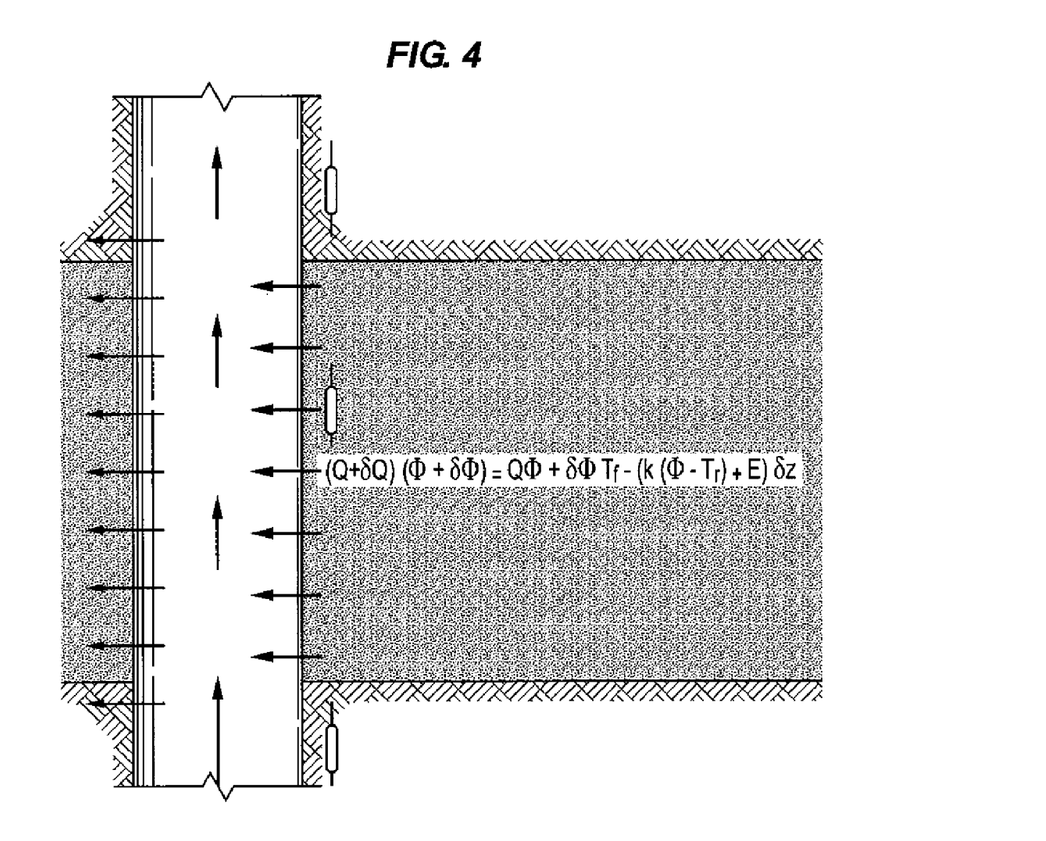

FIG. 4 shows a well having an infinite number of zones in which a system of differential equations can be defined. It can be shown that $$\delta Q \delta\theta \to 0 \quad\quad \text{(Eq. 2)}$$
$$as\ \delta z \to 0$$
$$so\ \delta Q(\theta - T_f) + \delta\theta Q + (k(F - Tr) + E)\delta z = 0$$

which gives a differential equation relating $dQ/dz$ to $d\theta/dz$. Analysis of this differential equations shows that an optimal location for measuring $\theta$ is where $\delta Q$ is small (e.g., in a zone having no radial flow). This has important consequences in the design of the completion. In particular, it may be possible to assemble the completion in terms of components which allow radial flow and components which do not (e.g. where there are sections of base pipe, threads, cross-couplers, etc). The mathematical analysis shows that these sections are optimal for placing temperature sensors. In a real world application, the physics of the fluid flow will be a lot more complicated than described above (turbulence, friction losses, non-Newtonian affects on the fluid, etc) but the conclusion is the same: if the completion can be designed to have intervals with non-radial flow, then those zones will be the optimal location to measure temperature, if that temperature is going to be subsequently used to infer flow along the tubing.

When the heat loss to the formation, K, is significant, then the fluid will cool as it flows to the surface, and this change of temperature should be taken into account in the determination of flow. Appropriate equations are known in the industry, such as detailed in, for example, U.S. Pat. No. 6,618,677, entitled "Method and apparatus for determining flow rates," by G. Brown, which is incorporated herein by reference.

It is noted that the solution to the system of differential equations can be solved for analytically or numerically. Since there is not an infinite number of sensors for the theoretical infinite number of zones in FIG. 4, measurements from discrete sensors along the well can be interpolated to approximate temperature measurements for the purpose of solving for the system of equations according to the above. Alternatively, note also that heat-flux sensors (discussed further below) can provide δθ at discrete locations as an alternative to measuring the difference between two temperatures sensors.

In general, one can assume that there will be a larger number of flowing zones than sensors. In such a case additional information should be provided to obtain a solution. The THERMA software package, for example, from Schlumberger approaches this by assuming that the flow distribution is close to a flow distribution which would come from a theoretical forward model for a certain combination of reservoir pressures, permeabilities, etc. That forward model is then iterated statistically over a variety of input parameters until the theoretical temperature distribution is close to the measured temperature. Such statistical techniques are described, for example, in WO 2006/010875, entitled "Well Characterisation Method", by S. Kimminau, et al., which is incorporated herein by reference. In this way, it is clear that temperature measurement can give indications of not just fluid flow, but also of reservoir properties.

Other techniques to solve the under-determined problem can also be used. For example, it is possible to add a weighting based on the rate of change of the flow—the inversion would then minimize not just the difference between the theoretical temperature and the measured temperature but also minimize any cross-flow. In a specific example, for a given spacing of temperature measurements A and B, it would theoretically be possible for a certain amount of warm fluid to enter from a small zone between A and B, and that some short distance higher the same amount of fluid flows back out of the wellbore through a separate zone without this showing any effect on the temperatures on A and B. A robust minimization technique would come up with that solution that had the minimal cross-flows.

In FIG. 1, each non-radial flow zone 126, 128, and 130 is completely isolated from flow of fluids using pairs of packers. However, in some embodiments, at least some of the temperature sensors 134, 136, and 138 may actually be exposed to fluids, such as when some of the packers of FIG. 1 are removed. In such scenarios, to reduce the effect of exposure to fluids on the temperature reading taken by each of the sensors 134, 136, and 138, the temperature sensors 134, 136, and 138 can be covered with a thermal insulator (e.g., a thermally insulative layer) such that the sensors 134, 136, and 138 are thermally contacted to respective pipe sections 135, 137, and 139, but are thermally isolated from surrounding wellbore fluids. Note that the cable 140 that interconnects the temperature sensors 134, 136, and 138 can also be clad in a thermal insulator.

In one embodiment, the sensors 134, 136, and 138 can be resistance temperature detectors (RTDs), which measure temperature based on known correlations between electrical resistance of electrically conductive materials and changing temperature. In many cases, RTDs are formed using a thin-film of platinum which takes advantage of platinum's linear resistance-temperature relationship and its resistance to oxidization effects (which could otherwise change the resistance-temperature relationship) to make a robust measure of temperature. However, RTDs formed of other materials can also be used.

Figure 5:
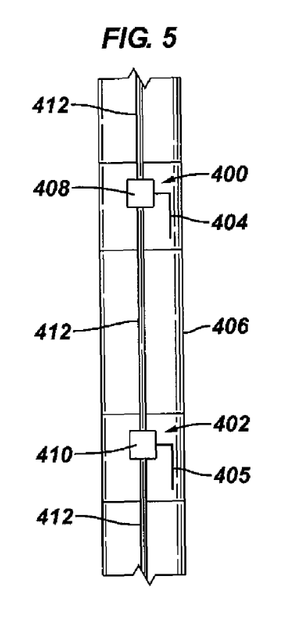
FIG. 5 illustrates a portion of a sensor cable, according to an embodiment.

FIG. 5 depicts example RTDs 400 and 402. The RTDs 400, 402 are part of a control line 406, which can be a steel control line or the like. Each RTD 400, 402 includes an RTD wire filament 404, 406 (e.g., platinum filament) that has a resistance that varies with temperature. Each filament 404, 406 is electrically connected to a corresponding electronic chip 408, 410 for detecting the resistance of the RTD wire filament 404, 406 to enable temperature detection. In one example, the electronic chip 408, 410 can be a multi-chip-module (MCM), which can have an analog-to-digital converter and a digital transmitter embedded on the same chip such that the output can be digital data along wires 412 that interconnect the RTDs 408, 410.

Longer RTD filaments can alternatively be used, with the longer RTD filaments providing for even better averaging of temperatures around the RTD. However, it is noted that compared to the reservoir or fluids, the completion itself will have a much higher thermal conductivity so it will itself have the effect of averaging the temperature. In this sense, good thermal coupling between the RTD and the base pipe removes the need for long RTD filaments.

In addition to using temperature sensors as depicted in FIG. 1, it is noted that additional sensors can be provided. One such example includes heat flux sensors that can be added to the array of sensors to measure change in temperature over a particular interval as opposed to computing the change in temperature over a particular interval.

The heat flux sensors can be placed in respective flow zones, such as heat flux sensors (502, 504, 506 in FIG. 5). Heat flux sensors provide measurements that can be used to solve the following equation:

$$\left( (T_f - \theta) \frac{dW}{dZ} - \frac{d\theta}{dZ} W = k(\theta, T_r), \right. \tag{Eq. 4}$$

where dW represents the flow from the reservoir into the wellbore in each flow zone, and dZ represents the length of the interval of the flow zone. The parameter $$\frac{d\theta}{dZ}$$

is the heat flux, which can be measured directly by a corresponding heat flux sensor. The parameter W represents the flow entering a flow zone from below in the wellbore.

In terms of Eq. 1, dW is equal to $Q_2-Q_1$, and W is equal to $Q_1$. Thus, $Q_2$ is equal to W+dW. The measurement data from the different flux sensors 502, 504, and 506 in respective flow zones provide a system of equations according to Eq. 2, such that a numerical analysis can be performed to solve for W in each corresponding flow zone.

Thus, with the arrangement of FIG. 5, the array of sensors includes a heat flux sensor positioned in each zone having radial flow, while temperature sensors (depicted in FIG. 1) are provided in non-radial flow zones.

Another type of sensor that can be provided in the array is a flow rate sensor, such as a venturi-type sensor that measures a pressure drop across an orifice. The pressure drop is expressed as $\Delta P$. Note that as discussed above, the incoming fluid temperature $T_f$ (incoming from the reservoir) differs from the reservoir temperature $T_r$ (due to the Joule-Thompson effect). As the fluid sees a pressure drop, the temperature of the fluid also drops. In this case, if $\Delta P$ is known (where the pressure drop is from the reservoir to the wellbore), then $T_f$ can be expressed in terms of $T_r$ such that solving for the equations (Eqs. 1 or 2) to derive the fluid flow information is made simpler.

Reservoir temperature can be inferred from temperature measurements made while drilling the well, or from measurements made from logging tools lowered into the well after drilling has completed. Reservoir temperature for a particular zone can also be derived by combining measurements from individual wellbores into a structural model of the whole reservoir.

Instead of measuring fluid flow using venturi-type sensors, other types of flow measurement sensors, including RTDs configured as flow sensors can be used. Such sensors are based on an operational principle that states that the rate of heat absorbed by a flow stream is directly proportional to its mass flow. As molecules of a moving fluid come into contact with a heat source, they absorb heat and thereby cool the source. At increased flow rates, more molecules come into contact with the heat source, absorbing even more heat. The amount of heat dissipated from the heat source in this manner depends upon the number of molecules of a particular fluid, the thermal characteristics of that fluid, and its flow characteristics. Two balanced platinum RTD's are required. One acts as a temperature sensor reference; the other is the active heated sensor. Heat loss produced by the flowing fluid tends to unbalance the heated flow sensor and it is forced back into balance by the electronics.

Such sensors are widely used in flow metering, especially gas flow metering, but have largely been avoided in downhole permanent monitoring because of the desire to not have any sensors in the wellbore passage. However, by placing RTDs implemented as flow sensors into the radial openings of a sand screen they can provide a direct measure of flow rates without inhibiting any subsequent passage of a wireline tool. From such flow rates, pressure drop can be derived such that $T_f$ can be expressed in terms of $T_r$ to simplify the solving of equations discussed above.

For another embodiment, optical temperature measurements can be used to span the interval between the RTD's. The optical temperature measurements can provide information across those sections with radial flow. In this scenario, it may be optimal to have very weak thermal coupling between the optical temperature device and the completion, so that the averaging effect of the completion is removed. Conversely, it may be optimal to have very good thermal coupling between the temperature sensing and the annular fluid. In one embodiment, this optical measurement can be done by incorporating an optical fiber into a cable which is in turn protected by a thermally conductive encapsulation material. The optical temperature measurements can suffer from hydrogen-ion induced drift, so the discrete temperature measurements from the RTD can also be used to calibrate the optical distributed temperature measurements.

Figure 6:
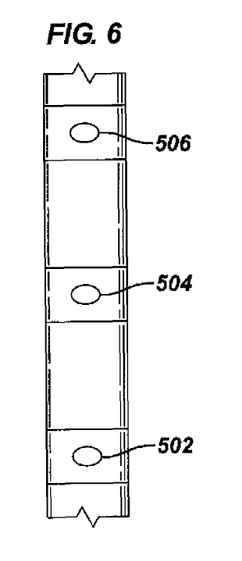
FIG. 6 illustrates use of heat flux sensors, according to an embodiment.
Figure 7:
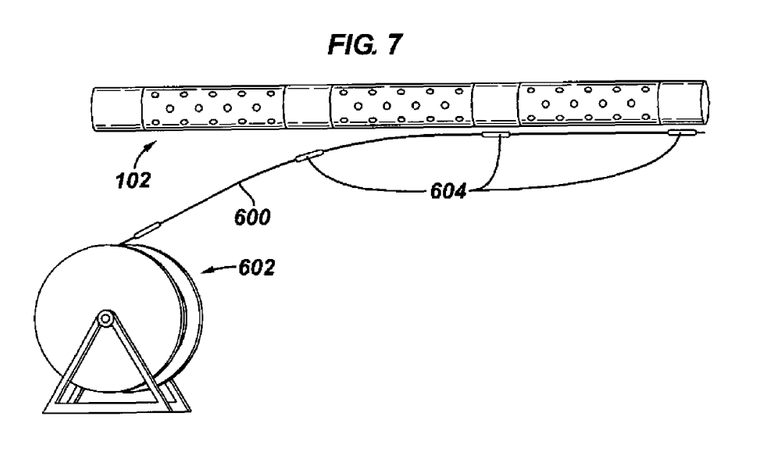
FIG. 7 illustrates deployment of a sensor cable from a spool, according to an embodiment.

FIG. 6 shows a sensor cable 600 that is deployed on a spool 602. The sensor cable 600 includes multiple discrete sensors 604 that are provided along the length of the sensor cable 600. To deploy the sensor cable 600 with the screen assembly of the lower completion section 102, the sensor cable 600 is unwound from the spool 602 and attached to the screen assembly 102. Once the desired length of the sensor cable 600 is unwound from the spool 602, the sensor cable 600 can be cut for deployment into the wellbore.

Figure 8:
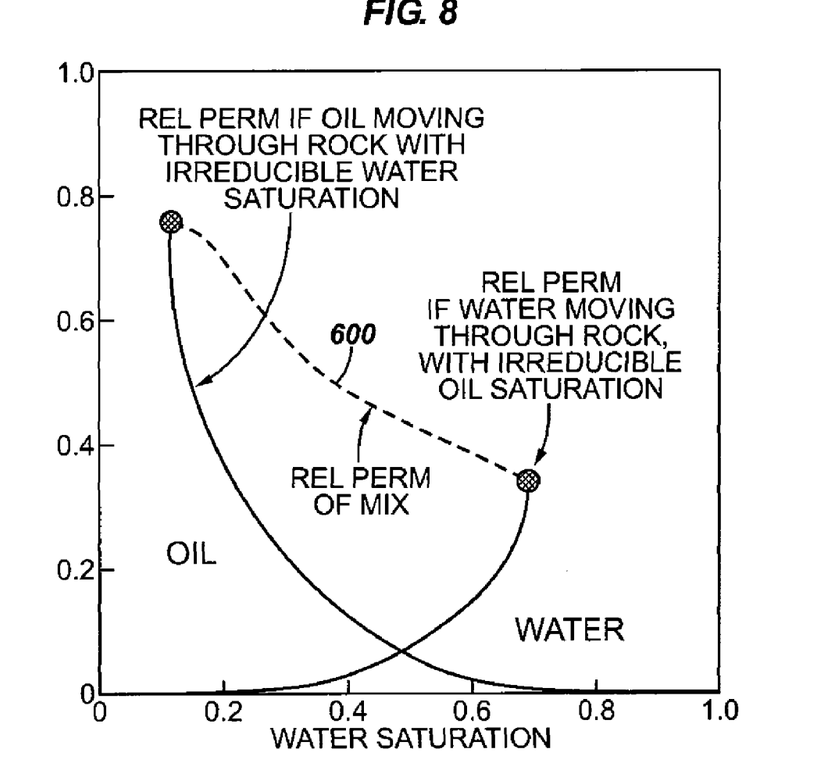
FIG. 8 illustrates definition of relative permeability curves

As discussed above, derivation of fluid flow from the discrete temperature measurements involves an estimate of the reservoir temperature. Other reservoir information can be used to further refine the understanding of flow. For example, FIG. 8 shows the relative permeability of two different fluids within a producing zone (in this case oil and water). Roughly speaking, gas will have a higher relative permeability than water whereas the relative permeability of oil versus water depends on whether the rock is naturally oil wet or water wet. The relative permeability of one fluid component is defined as the permeability of that component divided by the total permeability.

Because of the difference in relative permeability, if during production one fluid is replaced by another, then the effective permeability (represented by dashed curve 600) seen by that fluid changes, which will change the flow contribution from that zone, and hence change the temperature distribution. Working backwards, in this way an algorithm can be developed which uses the discrete measurements, and their change over time, to infer the change of flow from one fluid type to another.

Figure 9A:
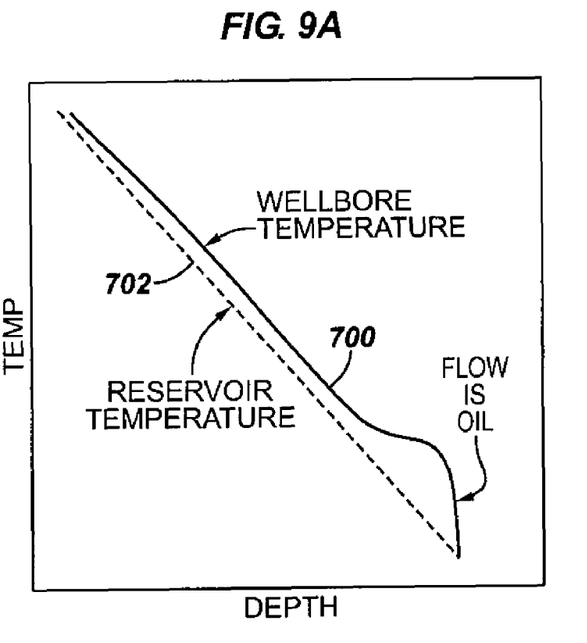
FIGS. 9A-9B illustrate temperature data with relative permeability curves to derive flow of individual fluid phases according to an embodiment.
Figure 9B:
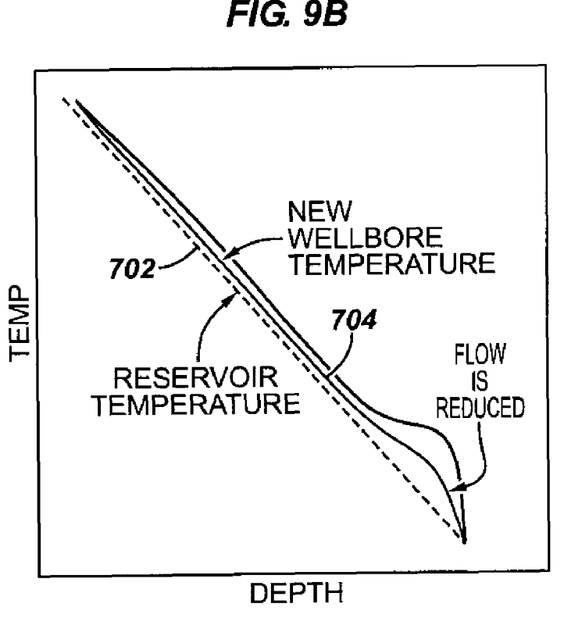

The algorithm proceeds as shown in FIGS. 9A-9B. In FIG. 9A, the geothermal gradient gives the initial temperature (700) of the wellbore fluid (before the well was drilled) as a function of depth. FIG. 9A also shows the reservoir temperature 702 as a function of depth. As the well is completed and allowed to flow, then, as depicted in FIG. 9B, temperature sensors record the new completion temperature (704) and from the difference a flow estimate can be derived using the formulations discussed above. This temperature distribution is monitored over time. In the scenario shown, after some time water enters the zone which decreases the total flow rate, and so lowers the temperature seen by the sensors. The change in flow-rate can be compared to the relative permeability curve and hence the water saturation estimated. Note that this figure is a simplification to demonstrate the embodiment. In practice, one would have to account for the change of Joule-Thompson effect going from oil to the oil/water mixture and would also have to account for any change in pressure as the reservoir was being depleted.

A key to the success of the above algorithms, according to some implementations, is the interaction between the completion design and the sensor choice and placement. While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method for determining fluid flow information associated with a well, comprising:
    estimating reservoir temperature;
    receiving data from plural discrete temperature sensors in zones without radial fluid flow in the well, wherein the plural discrete temperature sensors are installed in at least one sand screen assembly; and deriving the fluid flow information associated with the well according to the received data from the plural discrete temperature sensors and the estimated reservoir temperature.

2. The method of claim 1, wherein receiving the data comprise receiving the data from the temperature sensors that are in thermal contact with corresponding pipe sections.

3. The method of claim 2, further comprising covering the plural discrete temperature sensors with respective thermal insulators to thermally isolate the temperature sensors from reservoir fluids.

4. The method of claim 2, wherein receiving the data from the plural discrete temperature sensors allows for each of the discrete temperature sensors to acquire a temperature that is an average of fluid temperatures within the corresponding pipe section.

5. The method of claim 1, further comprising providing a cable attached to the plural discrete temperature sensors, wherein the cable is also covered with a thermal insulator.

6. The method of claim 1, further comprising providing a cable interconnecting the plural discrete temperature sensors.

7. The method of claim 6, wherein providing the cable comprises providing a cable into which the discrete temperature sensors are integrated.

8. The method of claim 1, wherein receiving data from the discrete temperature sensors comprises receiving data from resistance temperature detectors.

9. The method of claim 1, wherein receiving data from the plural discrete temperature sensors installed in the sand screen assembly comprises receiving data from the plural discrete temperature sensors installed on the exterior of blank sections of the sand screen assembly.

10. A method for determining fluid flow information associated with a well, comprising:
estimating reservoir temperature;
receiving data from plural discrete temperature sensors in zones without radial fluid flow in the well;
receiving data from additional sensors placed in zones that contain radial fluid flows; and
deriving the fluid flow information associated with the well according to the received data from the plural discrete temperature sensors, the data received from the sensors placed in the zones that contain radial fluid flows, and the estimated reservoir temperature.

11. The method of claim 10, wherein receiving the data from the additional sensors comprises receiving the data from heat flux sensors or from flow rate sensors.

12. The method of claim 10, wherein deriving the fluid flow information comprises solving for a system of equations based on the received data from the plural discrete temperature sensors.

13. The method of claim 10, further comprising deriving reservoir properties from the received data from the plural discrete temperature sensors.

14. The method of claim 10, wherein receiving the data from the plural discrete temperature sensors and the additional sensors allows for each of the sensors to acquire a temperature that is an average of fluid temperatures within the corresponding pipe section.

15. The method of claim 10, wherein receiving the data from the plural discrete temperature sensors and the additional sensors allows for the derivation of an average of fluid temperatures at various locations along the well.

16. A method for determining fluid flow information associated with a well, comprising:
estimating reservoir temperature;
receiving data from plural discrete temperature sensors in zones without radial fluid flow in the well; and
deriving the fluid flow information associated with the well according to the received data from the plural discrete temperature sensors and the estimated reservoir temperature, wherein the fluid includes at least two components, and the method further comprising combining temperature data from the temperature sensors with an estimate of relative permeability of those components to determine fluid flow information of each component.

17. The method of claim 16, wherein receiving the data comprises receiving the data over one time period and receiving the data at a subsequent time period.

18. A system comprising:
an array of sensors deployed in a wellbore, wherein the array of sensors include discrete temperature sensors for positioning in zones without radial fluid flow in the wellbore;
a computer to derive fluid flow information associated with the wellbore according to the received data from the discrete temperature sensors and an estimate of reservoir temperature; and
a sand screen assembly that has blank sections, wherein the discrete temperature sensors are thermally contacted to the blank sections of the sand screen assembly.

19. The system of claim 18, further comprising an inductive coupler to communicate measurement data from the discrete temperature sensors to the computer.

20. The system of claim 18, wherein the discrete temperature sensors comprise resistance temperature detectors.

21. The system of claim 18, wherein the array of sensors further comprises heat-flux sensors.

22. The system of claim 18, wherein the array of sensors further comprise flow-rate sensors.

* * * * *